United States Patent
Krull

(10) Patent No.: US 9,808,744 B2
(45) Date of Patent: Nov. 7, 2017

(54) THREE-PART END CAP AND FILTER ELEMENT INCLUDING SAME

(71) Applicant: Timothy L. Krull, Kearney, NE (US)

(72) Inventor: Timothy L. Krull, Kearney, NE (US)

(73) Assignee: Baldwin Filters, Inc., Kearney, NE (US)

(*) Notice: Subject to any disclaimer, the term of this patent is extended or adjusted under 35 U.S.C. 154(b) by 566 days.

(21) Appl. No.: 14/142,077

(22) Filed: Dec. 27, 2013

(65) Prior Publication Data

US 2014/0190880 A1    Jul. 10, 2014

Related U.S. Application Data

(60) Provisional application No. 61/749,028, filed on Jan. 4, 2013.

(51) Int. Cl.
*B01D 27/08* (2006.01)
*B01D 29/11* (2006.01)
(Continued)

(52) U.S. Cl.
CPC ........ *B01D 29/114* (2013.01); *B01D 29/111* (2013.01); *B01D 29/21* (2013.01); *B01D 29/96* (2013.01); *B01D 46/2414* (2013.01); *B01D 2201/295* (2013.01); *B01D 2201/347* (2013.01); *B01D 2201/4053* (2013.01); *B01D 2271/02* (2013.01); *Y10T 29/49904* (2015.01)

(58) Field of Classification Search
CPC ...... B01D 27/08; B01D 29/96; B01D 29/111; B01D 35/30; B01D 35/306; B01D 46/2414; B01D 2201/291; B01D 2201/295; B01D 2201/301; B01D 2201/304; B01D 2201/305; B01D 2201/34; B01D 2201/347; B01D 2201/40; B01D 2201/4007; B01D 2201/4015; B01D 2201/4046; B01D 2201/4053; B01D 2201/4061; B01D 2201/4076; B01D 2201/4084; B01D 2271/02; B01D 2271/022; B01D 2271/027; Y10S 210/17; Y10T 29/49826; Y10T 29/49904

See application file for complete search history.

(56) References Cited

U.S. PATENT DOCUMENTS

| 1,761,924 A | 6/1930 | Kamrath |
| 3,361,260 A | 1/1968 | Buckman |

(Continued)

FOREIGN PATENT DOCUMENTS

| DE | 19960600 A1 | 6/2001 |
| EP | 0 880 987 A1 | 12/1998 |

(Continued)

OTHER PUBLICATIONS

Dahl Baldwin, Marine Diesel Fuel/Water Separators, Installation pamphlet, 2005, 10 pages.

*Primary Examiner* — Patrick Orme

(74) *Attorney, Agent, or Firm* — Reinhart Boerner Van Deuren P.C.

(57) ABSTRACT

A multi-component end cap is provided. The multiple components combine to form one or more seal carriers where each seal carrier is formed in part by at least two different ones of the components. Methods of manufacturing an end cap having multiple components are also provided.

14 Claims, 7 Drawing Sheets

(51) Int. Cl.
  *B01D 29/21*  (2006.01)
  *B01D 29/96*  (2006.01)
  *B01D 46/24*  (2006.01)

(56) References Cited

U.S. PATENT DOCUMENTS

| | | |
|---|---|---|
| 3,370,708 A | 2/1968 | Hultgren et al. |
| 3,384,241 A | 5/1968 | Nostrand |
| 3,420,377 A | 1/1969 | Vandersip |
| 3,988,244 A | 10/1976 | Brooks |
| 4,372,847 A | 2/1983 | Lewis |
| 4,719,012 A | 1/1988 | Groezinger et al. |
| 4,812,235 A | 3/1989 | Seleman et al. |
| 4,915,831 A | 4/1990 | Taylor |
| 5,078,877 A | 1/1992 | Cudaback et al. |
| 5,102,541 A | 4/1992 | Breitbach |
| 5,114,572 A | 5/1992 | Hunter et al. |
| 5,203,994 A | 4/1993 | Janik |
| 5,259,953 A | 11/1993 | Baracchi et al. |
| 5,300,223 A | 4/1994 | Wright |
| 5,302,284 A | 4/1994 | Zeiner et al. |
| 5,342,511 A | 8/1994 | Brown et al. |
| 5,350,506 A | 9/1994 | Dombek et al. |
| 5,362,390 A | 11/1994 | Widenhoefer et al. |
| 5,364,528 A | 11/1994 | Schwarz et al. |
| 5,390,701 A | 2/1995 | Lessley et al. |
| 5,486,288 A | 1/1996 | Stanford et al. |
| 5,560,824 A | 10/1996 | Sann et al. |
| 5,674,393 A | 10/1997 | Terhune et al. |
| 5,698,093 A | 12/1997 | Pyle et al. |
| 5,702,602 A * | 12/1997 | Brown ............... B01D 29/21  210/342 |
| 5,744,030 A | 4/1998 | Reid et al. |
| 5,788,859 A | 8/1998 | Biere |
| 5,817,234 A | 10/1998 | Dye et al. |
| 5,837,137 A | 11/1998 | Janik |
| 5,868,932 A | 2/1999 | Guichaoua et al. |
| 5,906,737 A | 5/1999 | Hoeppner |
| 5,906,740 A * | 5/1999 | Brown ............... B01D 27/08  210/440 |
| 5,938,921 A | 8/1999 | Janik et al. |
| 5,985,142 A | 11/1999 | Belden |
| 6,048,455 A | 4/2000 | Janik |
| 6,068,763 A | 5/2000 | Goddard |
| 6,171,491 B1 | 1/2001 | Popoff et al. |
| 6,187,188 B1 | 2/2001 | Janik et al. |
| 6,193,884 B1 | 2/2001 | Magnusson et al. |
| 6,235,194 B1 | 5/2001 | Jousset |
| 6,251,273 B1 | 6/2001 | Jawurek et al. |
| 6,387,259 B1 | 5/2002 | Roll |
| 6,485,635 B1 | 11/2002 | Gandini et al. |
| 6,488,845 B1 | 12/2002 | Neufeld et al. |
| 6,495,042 B1 | 12/2002 | Knight |
| 6,500,335 B2 | 12/2002 | Janik et al. |
| 6,506,302 B2 | 1/2003 | Janik |
| 6,517,717 B1 | 2/2003 | Håkansson |
| D472,299 S | 3/2003 | Fritze |
| D472,604 S | 4/2003 | Fritze |
| 6,565,746 B1 | 5/2003 | Stamey, Jr. et al. |
| 6,615,990 B1 | 9/2003 | Jokschas et al. |
| 6,652,740 B2 | 11/2003 | Schoess |
| 6,662,954 B2 | 12/2003 | Gottwald-Grill et al. |
| 6,673,250 B2 | 1/2004 | Kuennen et al. |
| 6,723,239 B2 | 4/2004 | Maxwell |
| 6,740,234 B1 | 5/2004 | Williams et al. |
| 6,863,811 B2 | 3/2005 | Janik |
| 6,881,334 B2 | 4/2005 | Janik |
| 6,896,803 B2 | 5/2005 | Cline et al. |
| 6,921,479 B2 | 7/2005 | Ardes |
| 6,977,006 B2 | 12/2005 | Reid |
| 7,042,346 B2 | 5/2006 | Paulsen |
| 7,048,488 B1 | 5/2006 | Kuznetsov et al. |
| 7,070,692 B2 | 7/2006 | Knight |
| 7,081,201 B2 | 7/2006 | Bassett et al. |
| 7,168,573 B2 | 1/2007 | Brown et al. |
| 7,744,758 B2 | 6/2010 | Dworatzek et al. |
| 8,057,669 B2 | 11/2011 | Beard et al. |
| 2002/0014452 A1 | 2/2002 | Janik |
| 2002/0166805 A1 | 11/2002 | Minns et al. |
| 2002/0185454 A1 | 12/2002 | Beard et al. |
| 2003/0019819 A1 | 1/2003 | Fritze |
| 2003/0226800 A1 | 12/2003 | Brown et al. |
| 2004/0144713 A1 | 7/2004 | Bassett et al. |
| 2005/0056582 A1 | 3/2005 | Patel et al. |
| 2005/0103692 A1 | 5/2005 | Stanhope et al. |
| 2005/0161378 A1 | 7/2005 | Cline |
| 2005/0161386 A1 | 7/2005 | Gustafson et al. |
| 2005/0194317 A1 | 9/2005 | Ikeyama et al. |
| 2006/0016745 A1 | 1/2006 | Nguyen et al. |
| 2006/0016769 A1 | 1/2006 | Hacker et al. |
| 2006/0054547 A1 | 3/2006 | Richmond et al. |
| 2006/0060512 A1 | 3/2006 | Astle et al. |
| 2006/0096934 A1 | 5/2006 | Weinberger et al. |
| 2006/0118475 A1 | 6/2006 | Girondi |
| 2006/0124516 A1 | 6/2006 | Merritt et al. |
| 2006/0151371 A1 | 7/2006 | Weinberger et al. |
| 2006/0180539 A1 | 8/2006 | Wolf et al. |
| 2006/0186031 A1 | 8/2006 | Fick et al. |
| 2006/0191836 A1 | 8/2006 | Dworatzek et al. |
| 2006/0219621 A1 | 10/2006 | Dworatzek |
| 2006/0219626 A1 | 10/2006 | Dworatzek et al. |
| 2007/0215561 A1 | 9/2007 | Yates et al. |
| 2008/0053879 A1 | 3/2008 | Harris |
| 2008/0264850 A1 | 10/2008 | Amesoder et al. |
| 2009/0127198 A1 | 5/2009 | Salvador et al. |
| 2009/0301950 A1 * | 12/2009 | Weindorf ............ B01D 35/147  210/130 |
| 2010/0044293 A1 * | 2/2010 | Fisher ............... B01D 27/005  210/232 |
| 2010/0044295 A1 | 2/2010 | Honermann et al. |
| 2010/0140155 A1 | 6/2010 | Gift et al. |
| 2012/0273406 A1 * | 11/2012 | Beard ............... B01D 29/21  210/232 |
| 2013/0193054 A1 | 8/2013 | Beard et al. |

FOREIGN PATENT DOCUMENTS

| | | |
|---|---|---|
| JP | H09173717 A | 7/1997 |
| WO | WO 97/16235 A1 | 5/1997 |
| WO | WO 97/21478 A1 | 6/1997 |
| WO | WO 2007/053228 A2 | 5/2007 |

* cited by examiner

THREE-PART END CAP AND FILTER ELEMENT INCLUDING SAME

CROSS-REFERENCE TO RELATED PATENT APPLICATIONS

This patent application claims the benefit of U.S. Provisional Patent Application No. 61/749,028, filed Jan. 4, 2013, the entire teachings and disclosure of which are incorporated herein by reference thereto.

FIELD OF THE INVENTION

This invention generally relates to filter elements and filter assemblies for filtering fluids. This invention also generally relates to methods of making filter elements.

BACKGROUND OF THE INVENTION

It is necessary to remove particulates and impurities from fluids for many devices such as from fuel or air supplied to an engine or hydraulic fluid that is used in a transmission of a vehicle. Accordingly, the many devices will typically include a filter apparatus for removing particulate matter from the fluid before it is supplied to the downstream device or to clean the fluid for recirculation and reuse in the system.

Such filters typically include a filter element for trapping the particulate matter in a media. The element is configured so that it can be removed and replaced periodically as it becomes plugged with particulate matter. In order to allow for removal and replacement of the element, it is often mounted inside of a filter housing, which is in turn attached to a filter head having an inlet and an outlet port adapted for attachment of fluid lines directing fluid in to and away from the filter system.

The present invention relates to improvements in filter elements and the manufacture of filter elements.

BRIEF SUMMARY OF THE INVENTION

The present invention provides a new and improved end cap for a filter element as well as a filter element including such an end cap. Embodiments of the invention provide a new and improved method of manufacturing an end cap as well as a filter element incorporating the end cap.

In a particular embodiment, an end cap for a filter element including a first annular component, a second annular component, an outer seal and an outer seal carrier is provided. The second annular component is secured to the first component. The first and second annular components define a radially directed flow path therebetween when assembled together. The outer seal defines a radially outward directed sealing surface and a secondary sealing surface. The secondary sealing surface can seal with a filter housing. The outer seal carrier is defined in part by the first annular component and in part by the second annular component. The outer seal carrier axially secures the outer seal therein and is configured to expose the radially outward directed sealing surface of the outer seal. The outer seal carrier defines a first sealing surface. The secondary sealing surface of the outer seal sealingly contacting the first sealing surface of the outer seal carrier.

In one embodiment, the outward directed sealing surface of the outer seal extends radially outward further than the second annular component. The outward directed sealing surface may provide the radially outermost extremity of the end cap.

In one embodiment, the second sealing surface of the outer seal carrier is provided by the first annular component.

In one embodiment, the first and second annular components are ultrasonically welded to one another.

In one embodiment, the end cap further includes at least one axially extending lock detent extending axially outward from a top side of the first annular component. The end cap further includes, at least one housing key configured to secure the second annular component to a filter housing and prevent angular rotation between the second annular component and the filter housing. The filter element also includes a clocking arrangement between the first and second annular components to angularly locate the at least one axially extending lock detent relative to the at least one housing key.

In one embodiment, the end cap further includes at least one radially outward extending ejection tab secured to the first annular component. The clocking arrangement between the first and second annular components angularly locates the at least one radially outward extending ejection tab relative to the at least one housing key during assembly.

In one embodiment, the clocking arrangement is positioned radially inward of the outer seal carrier.

In one embodiment, the outer seal carrier is a groove that has a mouth that opens in a radially outward directed direction. The groove is formed by an axially extending flange and a radially outward extending flange of the first annular component and a radially outward extending flange of the second annular component.

In one embodiment, the radially outward extending flange or the axially extending flange of the first annular component provides the first sealing surface.

In one embodiment, the radially outward extending flange of the second annular component is an annular flange having a first inner diameter. The axially extending flange of the first annular component is axially received within the radially outward extending flange of the second annular component.

In one embodiment, the axially extending flange of the first annular component includes a stepped region defining an axial abutment. The radially outward extending flange of the second annular component axially abuts the axial abutment.

In one embodiment, the first annular component includes a first central aperture bound or surrounded by an annular disk portion. The second annular component includes a second central aperture bound/surrounded by an annular disk portion. The radially directed flow path being formed between the annular disk portions of the first and second annular components.

In one embodiment, the outer seal carrier is formed in part between a radially outward extending flange of the first annular component and a radially outward extending flange of the second annular component. The outer seal carrier has a mouth that opens in a radially outward directed direction. The second annular component defines at least one flow passage between the annular disk portion thereof and the radially outward extending flange. The at least one flow passage is in fluid communication with the radially directed flow path defined between the annular disk portions of the first and second annular components.

In one embodiment, the radially outward extending flange of the second annular component is attached to the annular disk portion of the second annular component by a plurality of angularly spaced webs. The webs, the radially outward extending flange, and the annular disk portion define the at least one flow passage.

In one embodiment, the outer seal carrier is formed in part between a radially outward extending flange of the first annular component and a radially outward extending flange of the second annular component. The outer seal carrier has a mouth that opens in a radially outward directed direction to allow for insertion of the outer seal.

In one embodiment, the end cap further includes an inner seal defining a radially inward directed sealing surface and a secondary sealing surface. A spacer is positioned between the first and second annular components. An inner seal carrier is defined in part by the first annular component and in part by the spacer. The inner seal carrier axially secures the inner seal therein and is configured to expose the radially inward directed sealing surface of the inner seal such that it can engage a radially outward directed sealing surface of a filter head. The inner seal carrier defines a secondary sealing surface. The secondary sealing surface of the inner seal sealingly contacting the second sealing surface of the inner seal carrier.

In one embodiment, the spacer includes an annular body and a plurality of angularly spaced apart standoffs that extend radially outward and axially therefrom. The standoffs are axially positioned between the first and second components and separate the first annular component from the second annular component. The first annular component, second annular component and standoffs define at least one flow passage therebetween in fluid communication with the radially directed flow path formed between the first and second annular components.

In one embodiment, the inner seal carrier is formed in part between a radially inward extending flange of the first annular component and an axial distal end of the spacer. The inner seal carrier has a mouth that opens in a radially inward directed direction to allow for insertion of the inner seal.

In one embodiment, a filter arrangement is provided. The filter arrangement includes an end cap, filter media and a housing. The end cap includes a first annular component, a second annular component, an outer seal and an outer seal carrier. The second annular component is secured to the first component. The first and second annular components define a radially directed flow path therebetween. The outer seal defines a radially outward directed sealing surface and a secondary sealing surface. The outer seal carrier is defined in part by the first annular component and in part by the second annular component. The outer seal carrier axially secures the outer seal therein and is configured to expose the radially outward directed sealing surface of the outer seal. The outer seal carrier defines a first sealing surface. The secondary sealing surface of the outer seal sealingly contacts the first sealing surface of the outer seal carrier. The filter media is secured to an inner side of the second annular component. The housing has an annular sidewall defining an open end and a central cavity. The sidewall defines a third sealing surface that is radially inwardly directed. The radially outward directed sealing surface of the outer seal sealingly contacting the third sealing surface. The filter media being positioned within the central cavity of the housing.

In one embodiment, the housing includes a radially outward extending thread and a key receiving groove formed in a radially inner side of the annular sidewall. The end cap further includes at least one axially extending lock detent extending axially outward from a top side of the first annular component; at least one housing key provided by the second annular component, the at least one housing key configured to engage the key receiving groove and prevent angular rotation between the second annular component and the filter housing; and a clocking arrangement between the first and second annular components to angularly locate the at least one axially extending lock detent relative to the at least one housing key, and prevent rotation of the at least one axially extending lock detent relative to the at least one housing key.

In one embodiment, the housing includes a radially outward extending thread and a key receiving groove formed in a radially inner side of the annular sidewall. The end cap further includes at least one radially outward extending ejection tab secured to the first annular component. The end cap further includes at least one housing key provided by the second annular component. The at least one housing key is configured to engage the key receiving groove and prevent angular rotation between the second annular component and the filter housing. The end cap further includes a clocking arrangement between the first and second annular components to angularly locate the at least one radially outward extending ejection tab relative to the at least one housing key during assembly. The clocking arrangement prevents rotation of the at least one radially extending ejection tab relative to the at least one housing key and radially outward extending ejection tab during rotation of the housing.

In one embodiment, a method of forming an end cap for a filter element where the end cap provides a radially directed flow path through the end cap is provided. The method includes forming a first annular component; forming a second annular component that is separate and independent of the first annular component; and securing the second annular component to the first annular component such that the radially directed flow path is formed between the first and second annular components.

In one embodiment, the step of securing the second annular component to the first annular component includes forming an outer seal carrier. The outer seal carrier is defined in part by the first annular component and in part by the second annular component. The outer seal carrier defines a first sealing surface configured to cooperate with a seal.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
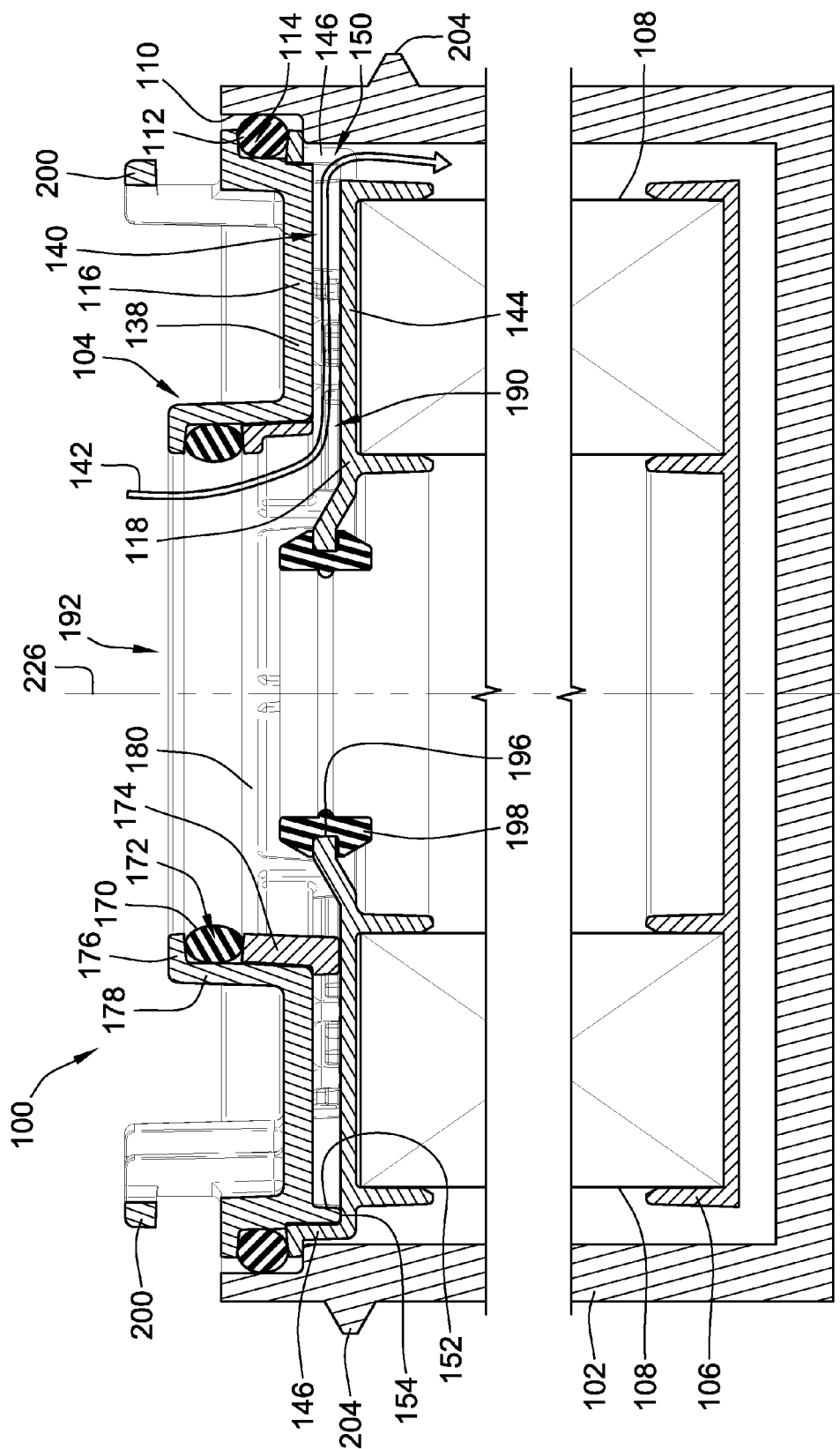
FIG. 1 is a cross-sectional illustration of a filter element inserted into a filter housing according to an embodiment of the present invention.

FIG. 1 is a cross-sectional illustration of a filter element 100 positioned within a central cavity of filter housing 102 (also referred to as "a filter bowl"). The filter element 100 generally includes a first end cap 104, a second end cap 106 and filter media 108 extending axially between the first and second end caps 104, 106.

The filter element 100 is a disposable filter element that is configured to be removed from housing 102 when the filter media 108 of the filter element 100 is spent and needs replacement. The filter housing 102 is a reusable component that axially receives the filter element 100. The filter element is a unitary component that is removable from filter housing 102 as a complete component.

The filter housing 102 defines a radially inward directed sealing surface 110 that cooperates with an outer seal 112. The outer seal 112 provides a radially outward directed seal that cooperates with the radially inward directed sealing surface 110 of the filter housing 102.

Figure 2:
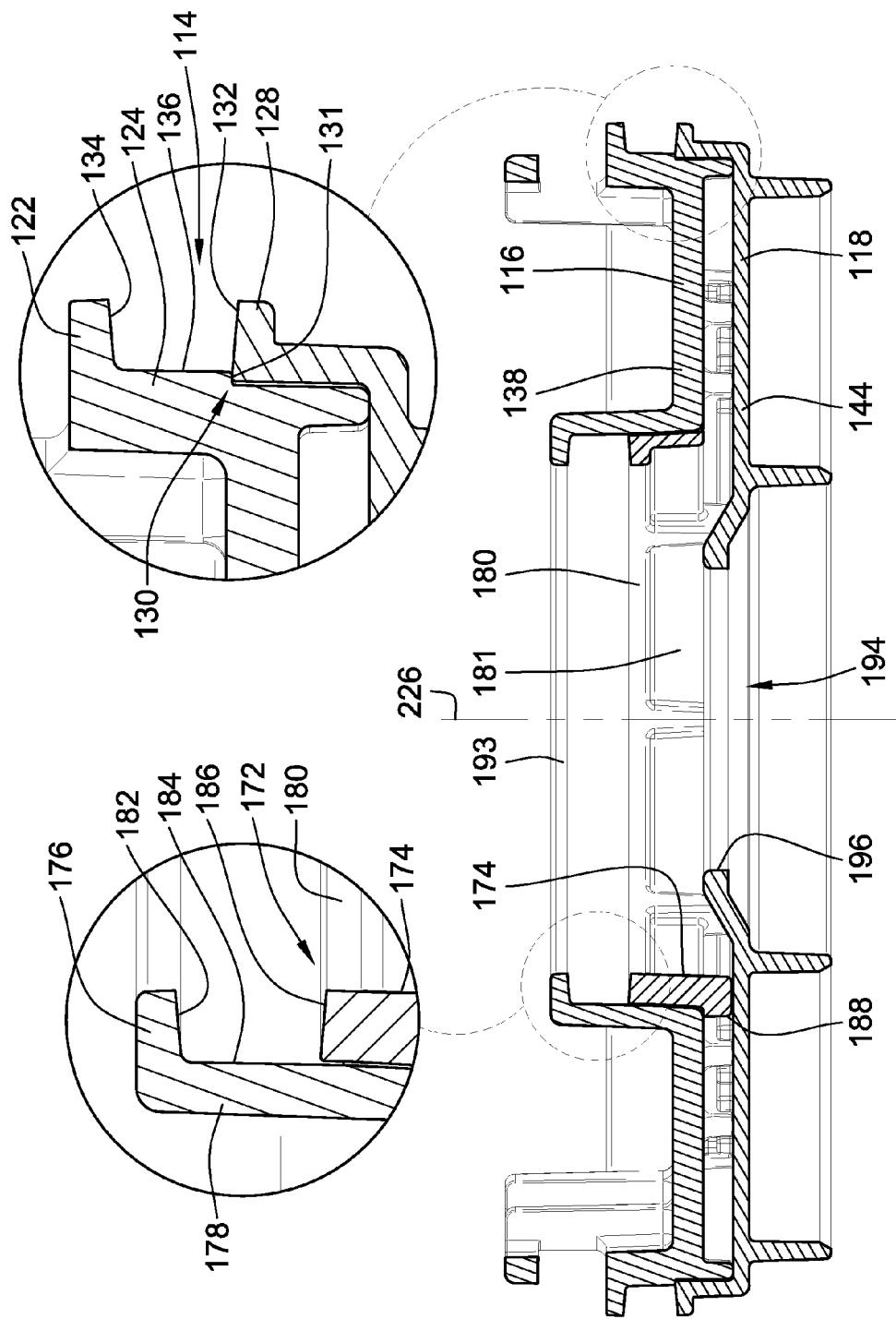
FIG. 2 is a cross-sectional illustration of the first end cap of the filter element of FIG. 1 with the seals removed therefrom.
Figure 3:
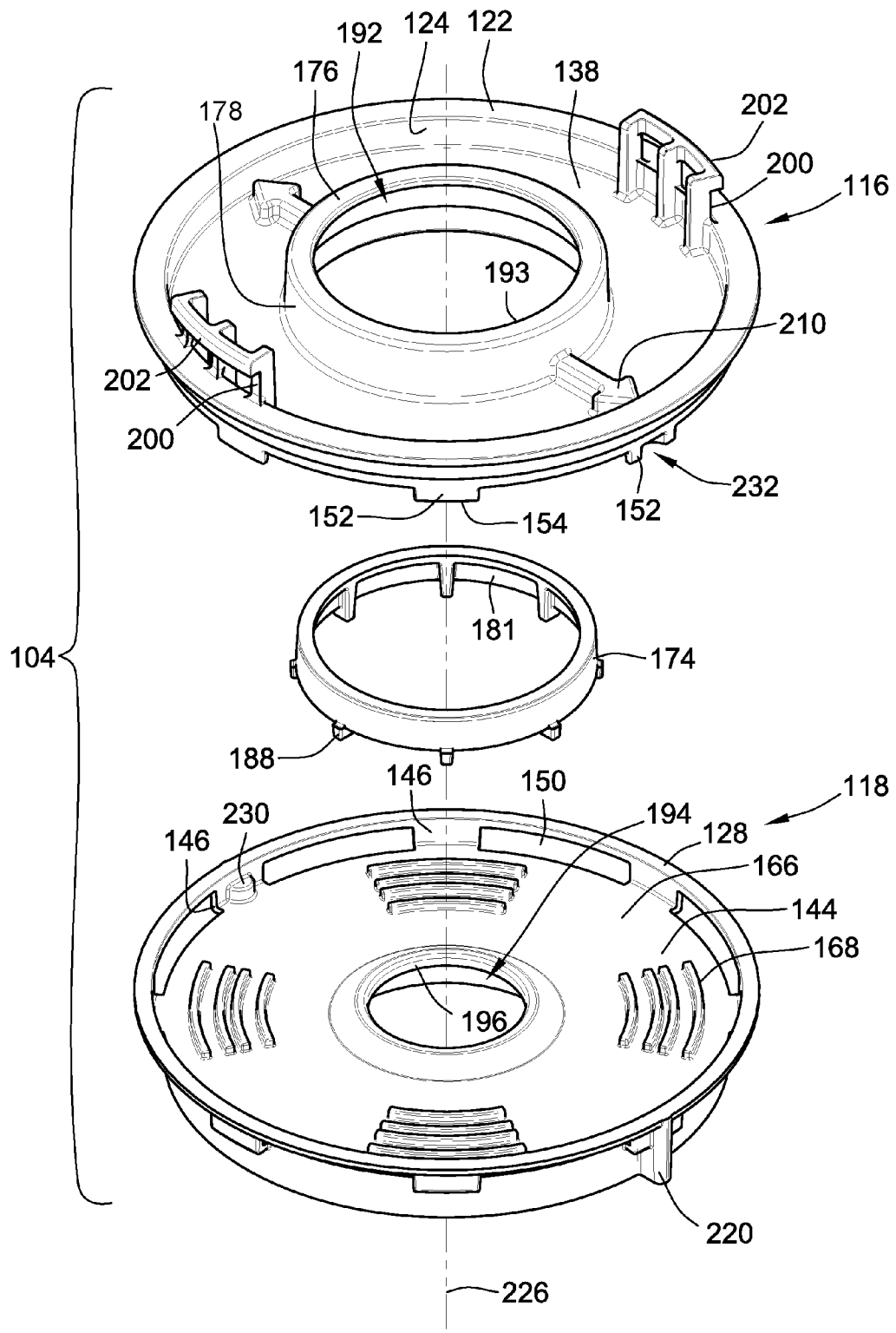
FIG. 3 is an exploded top illustration of the end cap of FIG. 2.

With additional reference to FIGS. 2 and 3, the outer seal 112 is carried by the first end cap 104 and particularly in an outer seal carrier 114 of the first end cap 104. The outer seal carrier 114 is a channel formed between a first annular component 116 and a second annular component 118 of the first end cap 104. The channel forming the outer seal carrier 114 has a radially outwardly directed mouth that receives outer seal 112 radially inward to mount the outer seal 112. The outer seal carrier 114 is formed in part by the first annular component 116 and in part by the second annular component 118. More particularly, the first annular component 116 includes a radially outward extending flange 122 and an axially extending flange 124 that form an L- or stepped-shape that form one side and a bottom of the outer seal carrier 114. The second annular component 118 includes a radially outward extending flange 128 that is axially spaced away from radially outward extending flange 122.

The first annular component 116 is axially received into the inner diameter of the radially outward extending flange 128 which is an annular flange. The first annular component 116 includes a stepped region 130 forming an abutment 131 proximate or formed by the axially extending flange 124. A top surface 132 of the radially outward extending flange 128 of the second annular component 118 axially abuts the abutment 131 of the stepped region when assembled.

The outer seal carrier 114 defines a seal surface that cooperates with a corresponding sealing surface of outer seal 112 to prevent fluid leakage therebetween. The sealing surface is provided by the first annular component 116 in this embodiment. The sealing surface can be provided by an axially inner surface 134 of flange 122 and/or a radially outward facing surface 136 of flange 124. In alternative embodiments where the portion of the outer seal carrier 114 provided by the second annular component 118 is fluidly sealed to the portion of the outer seal carrier 114 provided by the first annular component 116, the sealing surface of the outer seal carrier 114 could be provided by the axially facing abutment surface 132 of flange 128.

By providing the two radially outward extending flanges 122, 128 by different components, the molding of the end cap 104 can be more easily performed as there are no or reduced undercuts present in the mold of the components.

The outer seal carrier 114 and the structures that form the outer seal carrier 114 generally define an outer rim portion of the first end cap 104.

The axially extending flange 124 is continuous and is not fluid permeable, such as permeable to the fluid that is intended to be filtered by the filter element 100. The axially extending flange 124 connects the radially extending flange 122 with an impermeable disk portion 138.

The end cap 104 is designed to provide a radially directed fluid flow path 140 (illustrated by arrow 142) between the first and second annular components 116, 118. The second annular component 118 includes an impermeable disk portion 144 that is axially offset from the impermeable disk portion 138 of the first annular component 116 to define the radially directed fluid flow path 140.

Figure 4:
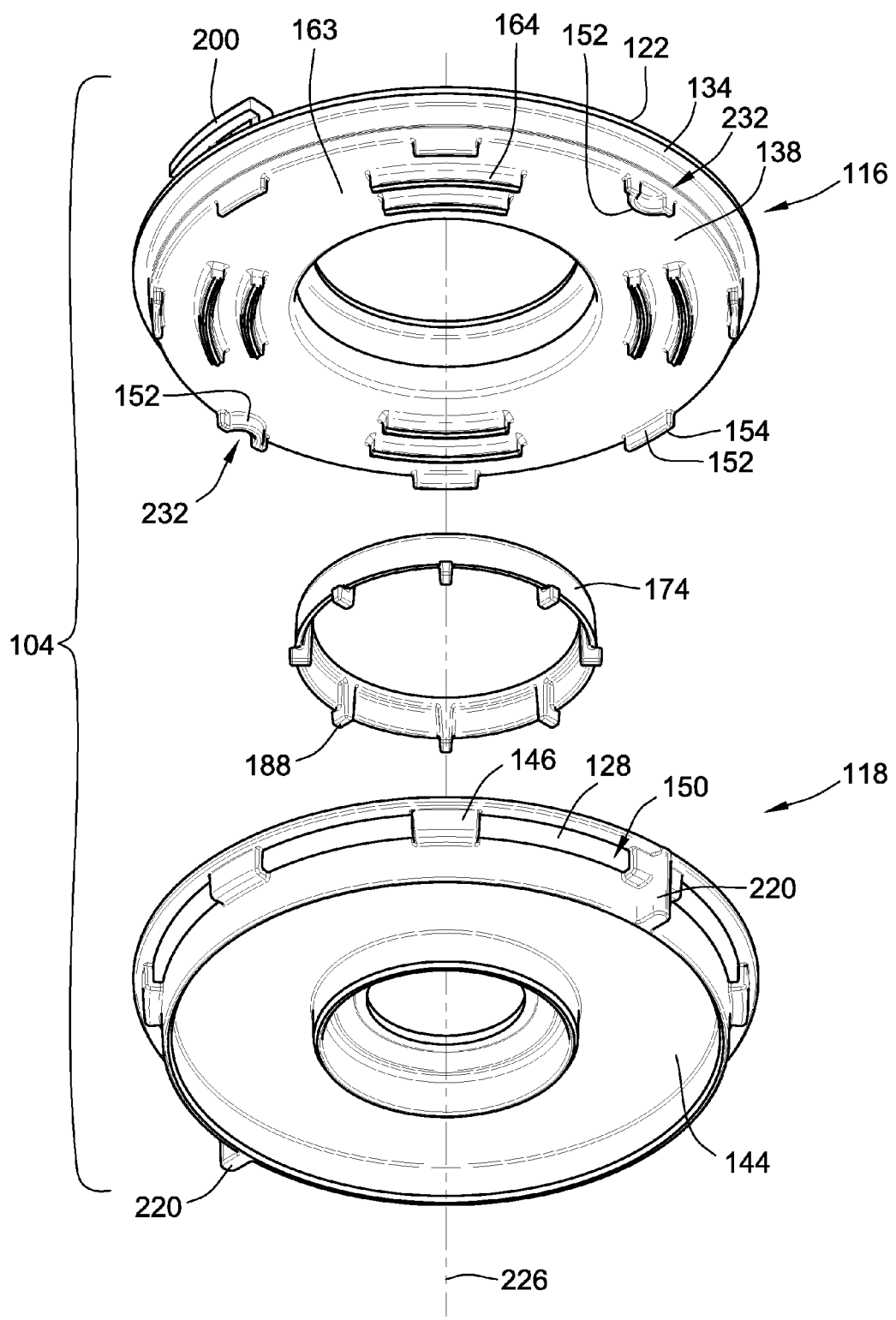
FIG. 4 is an exploded bottom illustration of the end cap of FIG. 2.

With reference to FIGS. 2-4, so that the fluid can exit or enter the fluid flow path 140, the radially outward extending flange 128 is attached to the impermeable disk portion 144 by one or more webs in the form of flanges 146. In the illustrated embodiment, a plurality of flanges 146 is provided that are angularly spaced apart from one another about the longitudinal axis of the filter element 100. These flanges 146, radially outward extending flange 128 and the impermeable disk portion 144 of the second annular component 118 define flow passage or opening 150 that allows fluid to pass therethrough. Flanges 146 are L-shaped in the instant embodiment. However, they could merely be axially extending or could even be radially extending in other embodiments.

The first annular component 116 includes a plurality of axially extending standoffs 152 that have distal ends 154 that axially abut a radially extending portion of flange 146. These standoffs 152 help axially space the impermeable disk portions 138, 144 from one another proximate the outer radially perimeters thereof, i.e. proximate the rim portion of the first end cap 104.

In one embodiment, the first annular component 116 is secured to the second annular component 118 by ultrasonic welding. To improve the weld between the two components 116, 118, the axially inner surface 163 of impermeable disk portion 138 includes a plurality of weld ribs 164 (see FIG. 4). The axially outer surface 166 of impermeable disk portion 144 includes a plurality of weld ribs 168 (see FIG. 3) that cooperate with weld ribs 164 of the first annular component 116. The weld ribs 168 are radially spaced forming receiving slots therebetween for receipt of weld ribs 164. Similarly, weld ribs 164 are radially spaced apart forming receiving slots therebetween for receiving weld ribs 168. In some embodiments, the standoffs 152 discussed above are not ultrasonically welded to flanges 146 so that they do not melt and maintain the appropriate axial offset between the first and second annular components 116, 118 during manufacture.

With reference to FIG. 1, an inner seal 170 is also carried by the first end cap 104. This inner seal 170 defines a radially inward directed sealing surface that will cooperate with a radially outward directed sealing surface of a filter head 171 (see FIG. 5 for the filter head) to which the filter element 100 and filter housing 102 are attached in operation. The first end cap 104 defines an inner seal carrier 172 (see also FIG. 2) for mounting the inner seal 170.

The inner seal carrier 170 is similar to the outer seal carrier 114 in that it is a channel formed axially between two separate components of the first end cap 104 that are formed separate from one another prior to assembly of the first end cap 104. This channel includes a radially inward directed mouth for receiving the inner seal 170.

With primary reference to FIG. 2, in the illustrated embodiment, first end cap 104 includes an axial spacer 174 that is formed separately from the first and second annular components 116, 118. The axial spacer 174 is secured axially between the first and second annular components 116, 118. The axial spacer 174 has multiple functions. First, the axial spacer defines part of the inner seal carrier 172. Additionally, the axial spacer 174 maintains axial spacing between the impermeable disk portions 138, 144 proximate the inner peripheries of the first and second annular components 116, 118.

The first annular component 116 includes a radially inward extending flange 176 and an axially extending flange 178 that form an L- or stepped-shape that form one side and a bottom (in a radially outward direction) of the inner seal carrier 172. The axial spacer 174 includes a radially inward extending flange 180 that is axially spaced away from radially inward extending flange 176 that forms the other side of the inner seal carrier 172. The radially inward extending flange 180 extends from an annular body portion 181.

The axial spacer 174 is axially received into the inner diameter of the axially extending flange 178, which is an annular flange.

The inner seal carrier 172 defines a seal surface that cooperates with a corresponding sealing surface of inner seal 170 to prevent fluid leakage therebetween. The sealing surface is provided by the first annular component 116 in this embodiment. The sealing surface can be provided by an axially inner surface 182 of flange 176 and/or a radially inward facing surface 184 of flange 178. In alternative embodiments where the portion of the inner seal carrier 172 provided by the axial spacer 174 is fluidly sealed to the portion of the inner seal carrier 172 provided by the first annular component 116, the sealing surface of the inner seal carrier 172 could be provided by an axially outward facing end surface 186 of flange 180.

By providing the two radially inward extending flanges 176, 180 by different components, the molding of the end cap 104 can be more easily performed as there are no or reduced undercuts present in the mold of the components.

The inner seal carrier 172 and the structures that form the inner seal carrier 172 generally define an inner hub portion of the first end cap 104.

The axially extending flange 178 is continuous and is not fluid permeable. The axially extending flange 178 connects the radially extending flange 176 with the impermeable disk portion 138.

The axial spacer 174 includes a plurality of radially extending standoffs 188 that are angularly spaced apart. The standoffs 188 extend axially away from a bottom end of annular body portion 181 (see e.g. FIG. 3). These standoffs 188 are positioned axially between the disk portions 138, 144 to maintain the axial spacing between the first and second annular components 116, 118. These standoffs also provide fluid flow passages 190, in combination with the first and second annular components 116, 118, that allow fluid to enter or exit the fluid flow path 140 formed between the impermeable disk portions 138, 144. By providing the axial spacer 174 as a separate component, these additional axial undercuts provided by the radially extending flow passages 190 are not provided by a single component.

The inner seal 170 is positioned adjacent a central aperture 192 of the first annular component 116. The central aperture 192 is sized to receive one or more portions of the filter head 171 to which the filter element 100 is configured to be mounted. Central aperture 192 is provided by a radially inner peripheral edge 193 of the first annular component 116 (See e.g. FIGS. 2 and 3), and particularly radially extending flange 176. The second annular component 118 defines a second central aperture 194 through which a second portion of a filter head 171 will extend. The second central aperture 194 is provided by an inner peripheral edge 196 of impermeable disk portion 144. A further inner seal 198 may be carried on this inner peripheral edge 196. The fluid flow path 140 will pass between inner seal 170 and inner seal 198 during operation.

Figure 5:
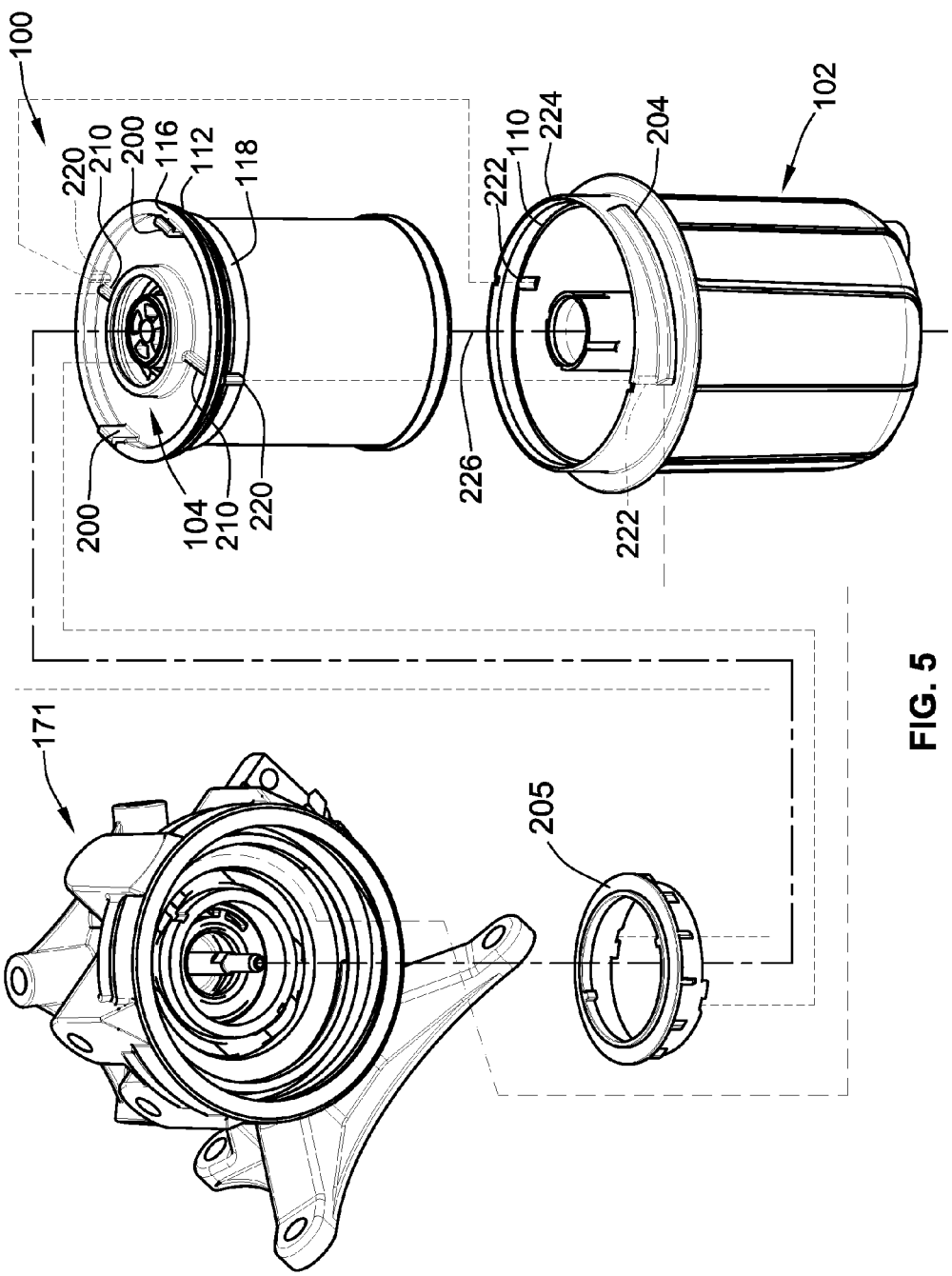
FIG. 5 is an exploded illustration of a filter head, filter element and filter housing formed in accordance with the present invention.
Figure 6:
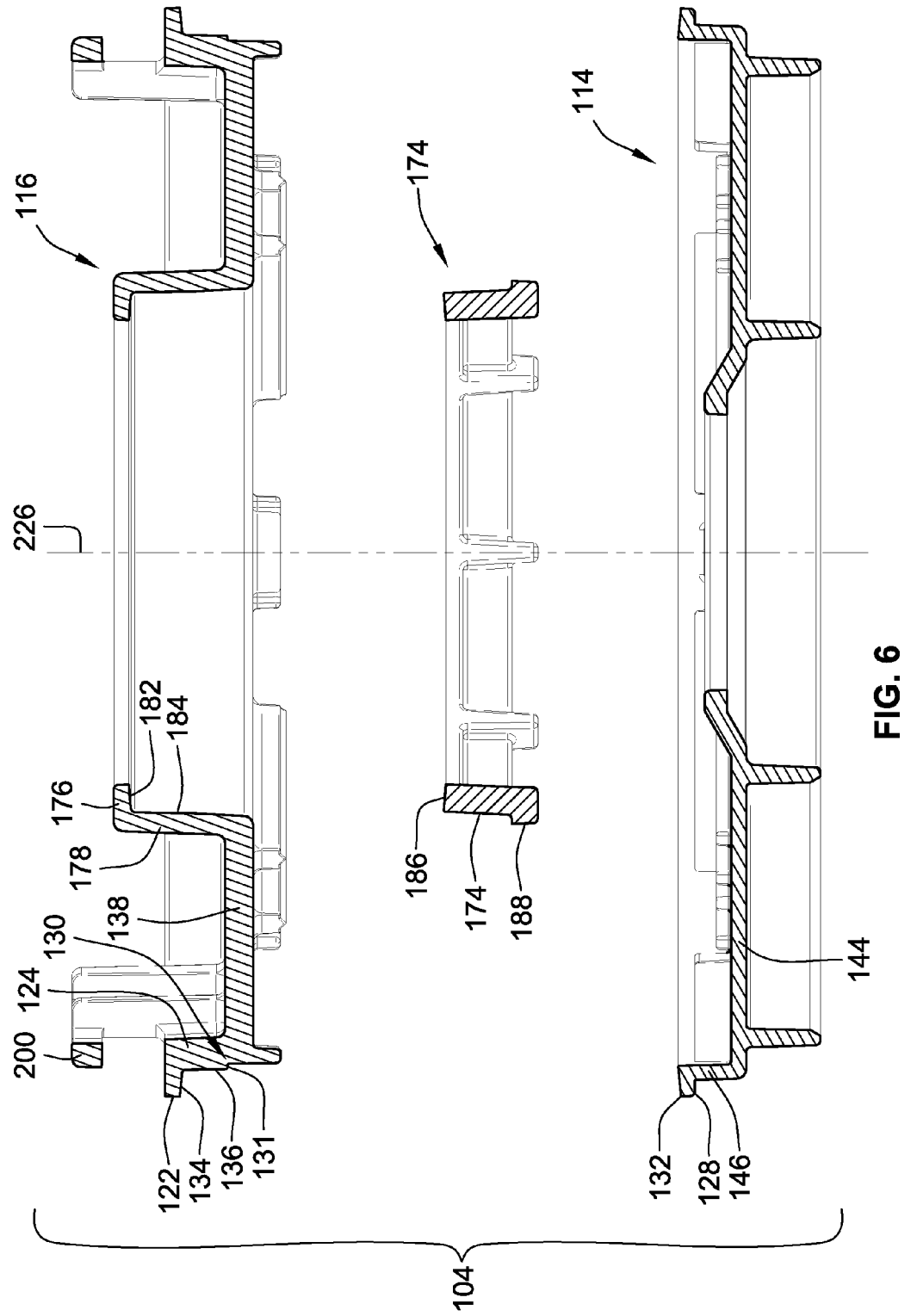
FIG. 6 is an exploded cross-sectional illustration of the end cap of FIG. 2.
Figure 7:
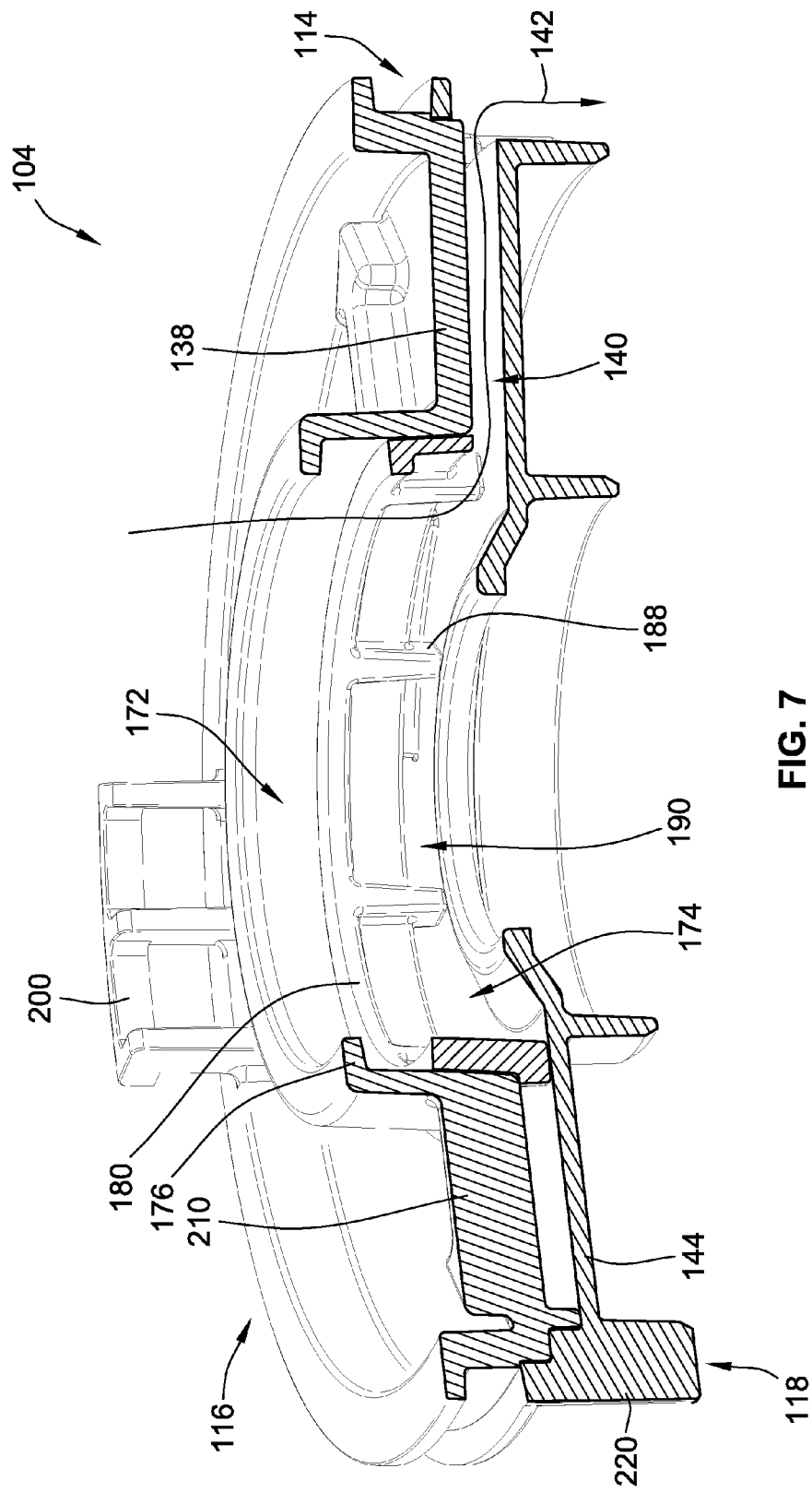
FIG. 7 is a top perspective cross-sectional illustration of the end cap of FIG. 2.

As mentioned above, the filter element 100 is intended to be mounted within a reusable filter housing 102. With reference to FIGS. 1, 3 and 5, the filter element 100 includes a plurality of ejection tabs 200 that axially engage a corresponding portion of the filter head 171 to which the filter element 100 and filter housing 102 are mounted during operation. These ejection tabs 200 have a radially outward extending catch portion 202 that will axially abut/engage a corresponding structure, typically a radially inward extending flange/shelf, of the filter head 171 as the filter housing 102 and filter element 100 are being axially disconnected from the filter head 171. This abutting/engaging action will axially pull the filter element 100 from its sealing engagement with filter housing 102 to make it easier to remove the filter element 100 during maintenance operations. More particularly, outer seal 112 will be disengaged or have reduced engagement with sealing surface 110. More information regarding such an ejection tab is provided in U.S. patent application Ser. No. 13/360,181, entitled Filter Apparatus with Ejection Arrangement, filed Jan. 27, 2012 and now published as U.S. Pat. Pub. No. 2013-0193054-A1 on Aug. 1, 2013, and assigned to the assignee of the instant application, the teachings and disclosure of which are incorporated herein in their entireties by reference thereto.

For the operation of the ejection tabs 200 to work in some embodiments, the ejection tabs 200 must be properly angularly aligned with mounting threads 204 of the filter housing 102 (see FIG. 1).

The filter head 171 may also include an axially spring biased torsion lock arrangement 205 that will lockingly engage the filter element 100 to a filter head 171. This feature is also illustrated in U.S. patent application Ser. No. 13/360, 181, as well as U.S. patent application Ser. No. 12/139,734, entitled Filter Element and Filter Assembly Including Locking Mechanism, filed Jun. 16, 2008 and now granted as U.S. Pat. No. 8,057,669 on Nov. 15, 2011, assigned to the assignee of the instant application, the teachings and disclosure of which are incorporated herein in their entireties by reference thereto.

The first end cap 104, and particularly, the first annular component 116, includes a plurality of axially outward extending torsion lock detents 210 that extend radially between the axially extending flange portions 124, 178. These torsion lock detents 210 are basically axially outward extending ribs that are generally radially elongated.

For the operation of the torsion lock arrangement 205 to work in some embodiments, the torsion lock detents 210 must be properly angularly aligned with mounting threads 204 of the filter housing 102.

The first end cap 104 includes one or more housing keys 220 (see FIGS. 3 and 5) that cooperate with corresponding key receiving slots 222 formed in a sidewall 224 of housing 102. These housing keys 220 will rotationally lock the filter element and particularly the first end cap 104 to the filter housing 102. As such, when the filter housing 102 is rotated to mount the filter housing 102 and filter element 100 to the filter head 171 using threads 204, the filter element 100 will also be rotated about its longitudinal axis 226. Thus, engagement between the housing keys 220 and grooves/slots 222 will prevent relative angular rotation between filter element 100 and the filter housing 102.

As illustrated in FIGS. 3 and 4, the housing keys 220 are provided by the second annular component 118. However, the torsion lock detents 210 and the ejection tabs 200 are provided by the first annular component 116. Therefore, the first end cap 104 includes a clocking feature for properly angularly aligning the first and second annular components 116, 118 during assembly. More particularly, the clocking feature angularly aligns the housing keys 220 with the torsion lock detents 210 and the ejection tabs 200. As such, when the filter element 100 is inserted into the filter housing 102 with housing keys 220 inserted into key receiving slots 222, the torsion lock detents 210 and ejection tabs 200 are properly angularly aligned with threads 204 of housing 102.

In the illustrated embodiment, the clocking feature is provided by a pair of radially inward extending projections 230 that extend radially inward from a flange 146 of the second annular component 118 and a receiving groove or recess 232 formed in standoffs 152 of the first annular component 116. If the first and second annular components 116, 118 are not properly aligned during assembly, the standoffs 152 that do not include grooves 232 will axially abut projections 230 such that the first and second annular components 116, 118 will not properly axially nest, indicating that that the components 116, 118 are not properly aligned.

The housing keys 220 are positioned radially inward of the outermost sealing surface of the outer seal 112 so that the housing keys 220 can slide axially past the radially inward directed sealing surface 110 of the filter housing 102. In the illustrated embodiment, the outer seal 112 provides the radially outer most extremity of the filter element 100.

The filter media 108 is sealingly attached to an axially inner side or surface of the impermeable disk portion 144 of the second annular component 118. The filter media 108 can take many forms and could, for example, be fluted filter media, pleated filter media, etc. In the illustrated embodiment, the filter media 108 is a tube of filter media that surrounds the longitudinal axis 226 of the filter element 100 (see FIG. 1). The terms "axial" and "radial" are based off of this longitudinal axis unless otherwise specified. This longitudinal axis 226 extends between the first and second end caps 104, 106 of the filter element 100.

The filter media 108 may be adhesively attached to the first end cap 104 or could be embedded into the axially inner side thereof. Other means of securing the filter media to the first end cap 104 can also be used.

The second end cap 106 is a closed end cap that closes the opposite end of the filter media 108 that is attached to the first end cap 104. The second end cap 106 can be attached to the filter media 108 in the same way as the first end cap 104. By closing the filter media 108, fluid is forced to pass through the filter media 108 so as to be filtered. The filter element 100 could be configured for a radially inward or radially outward directed fluid flow.

During manufacture of the filter element 100, the individual components of the first end cap 104 will be formed as separate components. Namely, the first annular component 116, second annular component 118 and axial spacer 174 will be formed as separate individual components. These components will then subsequently be secured to form a complete end cap.

The first annular component 116 including its impermeable or imperforate disk portion 138 and its portions of the inner and outer seal carriers 114, 172 are all formed as a single piece. As used herein a single piece shall not be construed to be plurality of separate pieces that are subsequently attached to one another. For instance, a single piece would be formed using a single mold or being machined from a continuous piece of material. Similarly, the second annular component 118 including its impermeable or imperforate disk portion 144 and its portions of the inner and outer seal carriers 114, 172 are all formed as a single piece. These single pieces are subsequently secured to one another.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An end cap for a filter element comprising:
   a first annular component;
   a second annular component secured to the first component, the first and second annular components defining a radially directed flow path therebetween;
   an outer seal defining a radially outward directed sealing surface and a secondary sealing surface;
   an outer seal carrier defined in part by the first annular component and in part by the second annular component, the outer seal carrier axially securing the outer seal therein and configured to expose the radially outward directed sealing surface of the outer seal, the outer seal carrier defining a first sealing surface, the secondary sealing surface of the outer seal sealingly contacting the first sealing surface of the outer seal carrier;

further comprising:

at least one axially extending lock detent extending axially outward from a top side of the first annular component;

at least one housing key configured to secure the second annular component to a filter housing and prevent angular rotation between the second annular component and the filter housing;

a clocking arrangement between the first and second annular components angularly locating the at least one axially extending lock detent relative to the at least one housing key;

at least one radially outward extending ejection tab secured to the first annular component;

wherein the clocking arrangement between the first and second annular components angularly locates the at least one radially outward extending ejection tab relative to the at least one housing key during assembly: and wherein the clocking arrangement is positioned radially inward of the outer seal carrier.

2. The end cap of claim 1, wherein the outward directed sealing surface of the outer seal extends radially outward further than the second annular component.

3. The end cap of claim 1, wherein the first and second annular components are ultrasonically welded to one another.

4. The end cap of claim 1, wherein the outer seal carrier is a U-shaped groove that has a mouth that opens in a radially outward directed direction, the U-shaped groove being formed by an axially extending flange and a radially outward extending flange of the first annular component and a radially outward extending flange of the second annular component.

5. The end cap of claim 4, wherein the radially outward extending flange or the axially extending flange of the first annular component provides the first sealing surface.

6. The end cap of claim 4, wherein the radially outward extending flange of the second annular component is an annular flange having a first inner diameter, the axially extending flange of the first annular component being axially received within the radially outward extending flange of the second annular component.

7. The end cap of claim 6, wherein the axially extending flange of the first annular component includes a stepped region defining an axial abutment, the radially outward extending flange of the second annular component axially abutting the axial abutment.

8. The end cap of claim 1, wherein:
the first annular component includes a first central aperture bound by an annular disk portion;
the second annular component includes a second central aperture bound by an annular disk portion;
the radially directed flow path being formed between the annular disk portions of the first and second annular components.

9. The end cap of claim 1, wherein the outer seal carrier is formed in part between a radially outward extending flange of the first annular component and a radially outward extending flange of the second annular component, the outer seal carrier has a mouth that opens in a radially outward directed direction to allow for insertion of the outer seal.

10. The end cap of claim 1, further comprising:
an inner seal defining a radially inward directed sealing surface and a secondary sealing surface;
a spacer positioned between the first and second annular components,
an inner seal carrier defined in part by the first annular component and in part by the spacer, the inner seal carrier axially securing the inner seal therein and configured to expose the radially inward directed sealing surface of the inner seal, the inner seal carrier defining a second sealing surface, the secondary sealing surface of the inner seal sealingly contacting the second sealing surface of the inner seal carrier.

11. The end cap of claim 10, wherein the spacer includes an annular body and a plurality of angularly spaced apart standoffs that extend radially outward, the standoffs being axially positioned between the first and second annular components and separating the first annular component from the second annular component, the first annular component, second annular component and standoffs defining at least one flow passage therebetween in fluid communication with the radially directed flow path formed between the first and second annular components.

12. The end cap of claim 10, wherein the inner seal carrier is formed in part between a radially inward extending flange of the first annular component and an axial distal end of the spacer, the inner seal carrier has a mouth that opens in a radially inward directed direction to allow for insertion of the inner seal.

13. The end cap of claim 1, wherein the first and second annular components are welded to one another.

14. The end cap of claim 1, wherein the outward directed sealing surface of the outer seal extends radially outward further than the outer seal carrier.

* * * * *